June 12, 1945.          J. M. WALTER          2,378,343
MACHINE TOOL GUIDE WAY
Filed Nov. 17, 1943
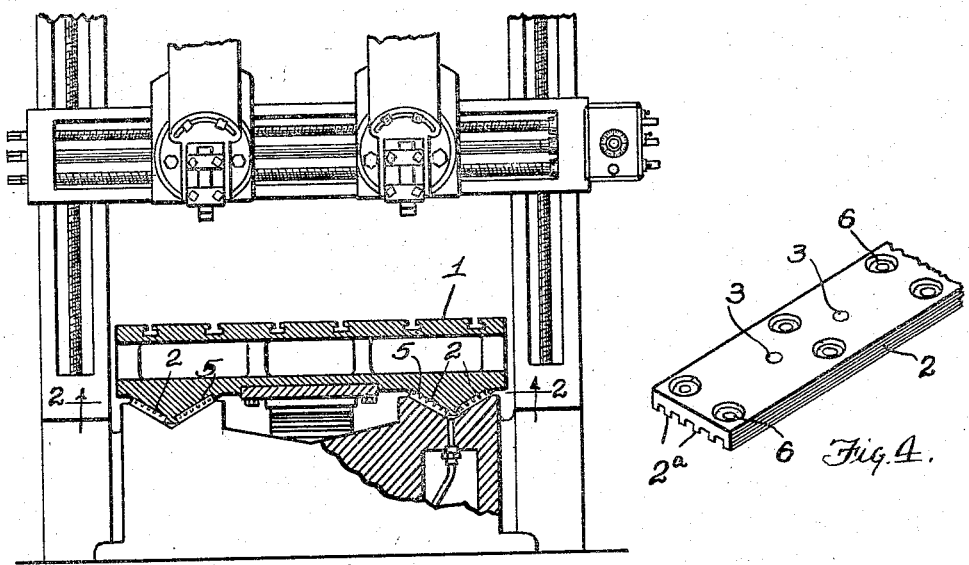
Fig. 1.
Fig. 4.
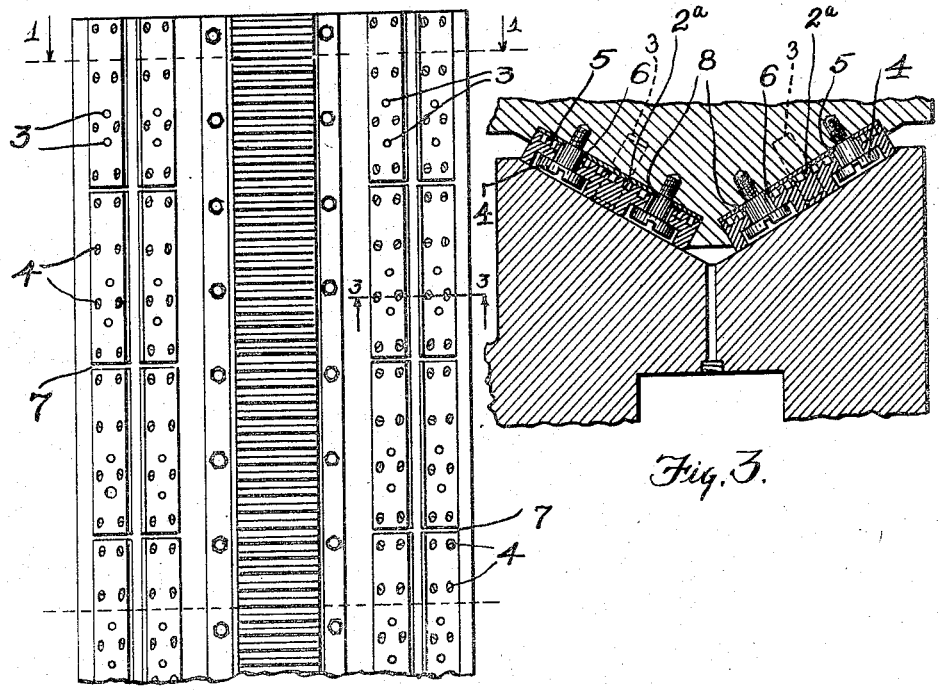
Fig. 2.
Fig. 3.
INVENTOR.
John M. Walter
BY Albert Allen
attorneys Patented June 12, 1945

2,378,343

UNITED STATES PATENT OFFICE 2,378,343

MACHINE TOOL GUIDEWAY

John M. Walter, Cincinnati, Ohio, assignor to The G. A. Gray Company, Cincinnati, Ohio, a corporation of Ohio Application November 17, 1943, Serial No. 510,701

7 Claims. (Cl. 308—3)

My invention relates to new and useful improvements in machine tool guide ways particularly as applied to planers, planer type grinders and the like, which have a reciprocating table and a bed on which the table, usually carrying the work, reciprocates.

The guide ways on the bed and table of planers usually consist of a pair of V-shaped guides, the point of the V being downward. In some machines the ways consist of one V and one flat guide way.

The guide ways are ordinarily machined as integral parts of the table and bed castings, being planed to gauges and then scraped. The scraping operation is done principally to improve the quality of the bearing surfaces tending to minimize the possibility of the surfaces scratching or scoring. The mating or bearing surfaces are ordinarily both of cast iron of nearly the same hardness.

Lubrication of the ways in modern planers is provided by pumping oil under a light pressure to each of the ways, thereby flooding the ways with oil. The oil pipes connect into the bed approximately midway of its length. Ways of the type described above have been used for many years with good success.

However, in recent years, due to greatly increased speed of table movement, which is necessary for using carbide cutting tools efficiently, and to save time on the return stroke, the need for improvement in the guide ways has become of great importance, and as far as I am advised, the industry has become so accustomed to the normal bed and table guide way support and its normal system of lubrication that an approach to solution of this vexing problem has only been approached from a point of view of selection of lubricants without an approach to the problem of solving the difficulties by a basic structural rearrangement.

With the greater speed of the table, an appreciable amount of heat is generated in the guide way or bearing surfaces and particularly in the surfaces on the table. These ordinarily are shorter than those on the bed.

In a planer, for example, having a table 22 feet long and operating on a 20-foot working stroke, the table will traverse a distance of over 42 feet on the bed. It is for this reason that the temperature rise in the table way surfaces, due to the heat generated at the surfaces, will be greater than in the bed way surfaces, since the table ways are in frictional contact at all times, whereas the bed is free from contact with the table ways for half of its length at all times at full stroke operation of the table. This temperature rise in the table way surfaces is sufficient to cause these surfaces to expand and to cause the table to become slightly curved longitudinally, the ends of the table then being higher than the middle.

Such a condition affects the accuracy of the machine and in turn the accuracy of the work being planed.

In recent years, in order to provide for maximum stiffness of the work tables in machines of the type noted, whereby the work can be clamped immovably thereon without distorting the table, and at the same time to avoid too great a weight to the table, it has become customary to provide for a box-like construction for the same. Thus, the tables have a base and a top and between them crosswise and lengthwise ribs which impart stiffness. With such a table wherein there is relatively poor heat transfer from the base to the top, the tendency of a heating of the base to distort the table becomes more pronounced. Thus, both the high speed and the table construction together present a problem in table mounting which has not been adequately dealt with in the art.

It is the essential object of my invention to provide for the table itself a bearing surface on the bed of the machine which results in a minimum of heat transfer from the bearing surface to the body of the table. This can be accomplished by the use of providing metal bearing surfaces and insulating them from the body of the table to which they are secured. It can also be provided by the use of bearing surfaces which are themselves of high heat insulation value.

The provision of special bearing surface on the bed does not meet the problem, nor have we found that using a relatively soft metal as a bearing surface against a hard metal constitutes a solution of the problem by cutting down the frictional action. Indeed, the lubrication systems of modern planers, for example, and the problems of starting and stopping at each end of the table stroke are such that mere co-efficient of friction on the bearing surfaces is not a sufficient guide to selection of means for my purpose.

It is not practical in such a construction to limit the bearing area of the table, as by the use of a few widely spaced pads, because the localized bearing surfaces will result in excessive wear, and necessary lubrication systems would not provide a proper lubrication for such an arrangement.

Since the provision of a poor heat transfer from the bearing face of a table ways means that the bearing surface itself will have to expand and contract differently from the remainder of the table, it has been my experience that it is necessary to provide for sectional bearing surfaces secured on the table ways and spaced and mounted so as at once to prevent actual shifting of the surface members as a whole, while permitting expansion and contraction, and at the same time present a substantially continuous bearing surface against the ways on the supporting bed.

Referring to the drawing in which I have illustrated my invention in combination with the table and bed of a planer:

Figure 1 is an end elevation with parts in section of a planer bed and table.

Figure 2 is an underneath plan view of the table as would appear along the lines 2—2 of Fig. 1.

Fig. 3 is a sectional detail along the lines 3—3 of Fig. 2.

Fig. 4 is a perspective view from the under side of a preferred type of bearing plate.

The table 1 of box-like construction is provided with bearing plates 2, which form the guide and bearing surfaces. The plates may be of any suitable length and are attached to the table so they are free to expand lengthwise. This may be accomplished in many ways. In the design shown here I have shown two dowel pins 3 closely spaced in a medial zone in the plate, to prevent endwise movement of the plate as a whole, while shoulder screws 4 are used to draw the plate down flat against the table V surfaces 5. The screws 4 are loosely fitted in enlarged holes 6 in the plate, to allow the plate to expand. A small endwise clearance space as indicated at 7 is left between the ends of the plates so the ends will not contact and tend to buckle due to lengthwise expansion.

A thin layer of insulating material 8 preferably is placed between the plates and the table V surface to minimize heat transfer from the plate to the table. The non-bearing surface of the plate and the table V's may also be coated with an insulating paint additional to using a sheet of insulating material, or the insulating paint may be used to replace the insulating material 8.

A preferred construction consists of making the plates of a laminated condensation product of the type designed for bearings for shafts of various kinds. These plates may be formed with a series of transverse ribs as at 2a, for the purpose of cutting down on heat transfer. The insulation 8 in this example is a type of insulating paper used for purposes of heat insulation.

I do not wish to be limited to the particular embodiment because, so far as I am advised, no one has determined in the past that high speed operation of tables on planers or the like can be accomplished without distortion of the tables, with no departure in standard lubrication, by the expedient of cutting down heat transfer from the actual bearing surfaces to the body of the table. This aspect of my invention is one of method or mode of operation, cures many problems involved in the high speed operation more particularly of the box-like work tables of the present day, and is not dependent upon the particular composition or mounting of the actual bearing surfaces.

One advantage of my invention is that heavy lubrication is not required in order to take care of the highly localized bearing conditions consequent upon a warping or bowing of the table due to heating in high speed operation. With the usual table and bed V's in a high speed planer of normal size, as distinguished from modern machines of great length, I have found that bowing of the table (with the best lubrication that I could provide) resulted in a spacing of the ends of the V's on the table after a short period of high speed operation of as much as .015 inch. What this means is that the table is actually in a definitely localized bearing contact with the V's on the bed, and the lubrication must be sufficient to take care of this localized bearing condition. With the heat transfer cut down by means of the insulated bearing surface procedure of my invention, less lubrication is needed because this condition is not met. This lessening of lubrication (in quantity) results in a saving in tendency of the table to push a body of oil ahead of it, and rise in its movement along the table as it picks up speed after each reversal. This table movement is deleterious to doing the extremely accurate work which is often called for in planer operations. Thus, with my invention the return speeds of the tables of planers, as an example, can be very high, and the working speeds much higher than previously, thus taking advantage of the modern, harder cutting tools to an enhanced degree.

Having thus described my invention, what I claim as new and desire to secure by Letters Patent is:

1. In machines of the class described, having beds with ways on the beds, and work carrying tables traversing said beds at high speeds, said tables having ways bearing against the ways on the bed, bearing surfaces mounted on the table ways to serve as the contact with the bed ways, said bearing surfaces consisting of a series of plates anchored against endwise movement with reference to the table ways and slightly spaced from each other lengthwise of the ways so as to permit of expansion and contraction, the plates having means for securing them with freedom for expanding motion with reference to the table ways, and heat insulation between the contacting surfaces of said plates and the mounting faces thereof on the table ways.

2. The combination of claim 1, in which the insulation referred to consists of the body of the plates themselves, they being formed of heat insulating material integral with the contacting surface.

3. The combination of claim 1, in which the insulation is inserted between said plates and the mounting faces on the table ways.

4. In machines of the class described, having beds with ways on the beds, and work carrying tables traversing said beds at high speeds, said tables having ways bearing against the ways on the bed, bearing surfaces mounted on the table ways to serve as the contact with the bed ways, said bearing surfaces consisting of a series of plates anchored against endwise movement with reference to the table ways and slightly spaced from each other lengthwise of the ways so as to permit of expansion and contraction, the plates having means for securing them with freedom for expanding motion with reference to the table ways, and heat insulation between the contacting surfaces of said plates and the mounting faces thereof on the table ways, said plates being formed of laminated condensation product and heat insulation material inserted therebetween and the mounting faces of the table ways.

5. In machines of the class described, having beds with ways on the beds, and work carrying tables traversing said beds at high speeds, said tables having ways bearing against the ways on the bed, bearing surfaces mounted on the table ways to serve as the contact with the bed ways, said bearing surfaces consisting of a series of plates anchored against endwise movement with reference to the table ways and slightly spaced from each other lengthwise of the ways so as to permit of expansion and contraction, the plates having means for securing them with freedom for expanding motion with reference to the table ways, and heat insulation between the contacting surfaces of said plates and the mounting faces thereof on the table ways, the anchoring against endwise movement comprising dowels in the plates engaging the table, and located intermediate the ends of the plates, and the means for securing the plates with freedom for expanding comprising members which engage the plates and the table with limited play.

6. In machines of the class described, having beds with ways on the beds, and work carrying tables traversing said beds at high speeds, said tables having ways bearing against the ways on the bed, bearing surfaces mounted on the table ways to serve as the contact with the bed ways, said bearing surfaces consisting of a series of plates anchored against endwise movement with reference to the table ways and slightly spaced from each other lengthwise of the ways so as to permit of expansion and contraction, the plates having means for securing them with freedom for expanding motion with reference to the table ways, the said plates being formed of laminated condensation product.

7. In a metal planer the combination of a bed and a table, ways on the bed and the table, and heat insulation for the table ways comprising heat insulating plates covering said ways and serving as a substantially continuous contacting surface with the ways on the bed, and means for holding the plates against endwise movement with reference to the table while retaining them with freedom for expansion and contraction against the under surface of said ways, whereby the table is freed from tendency to bow due to heating during operation of the planer.

JOHN M. WALTER.